3,329,462
VEHICLE SLIDING ROOF CLOSURE
Karl Baur, Poststrasse 40, Stuttgart-Berg, Germany
Filed Jan. 29, 1965, Ser. No. 429,090
Claims priority, application Germany, Mar. 20, 1964,
B 76,000; June 18, 1964, B 77,295
23 Claims. (Cl. 296—137)

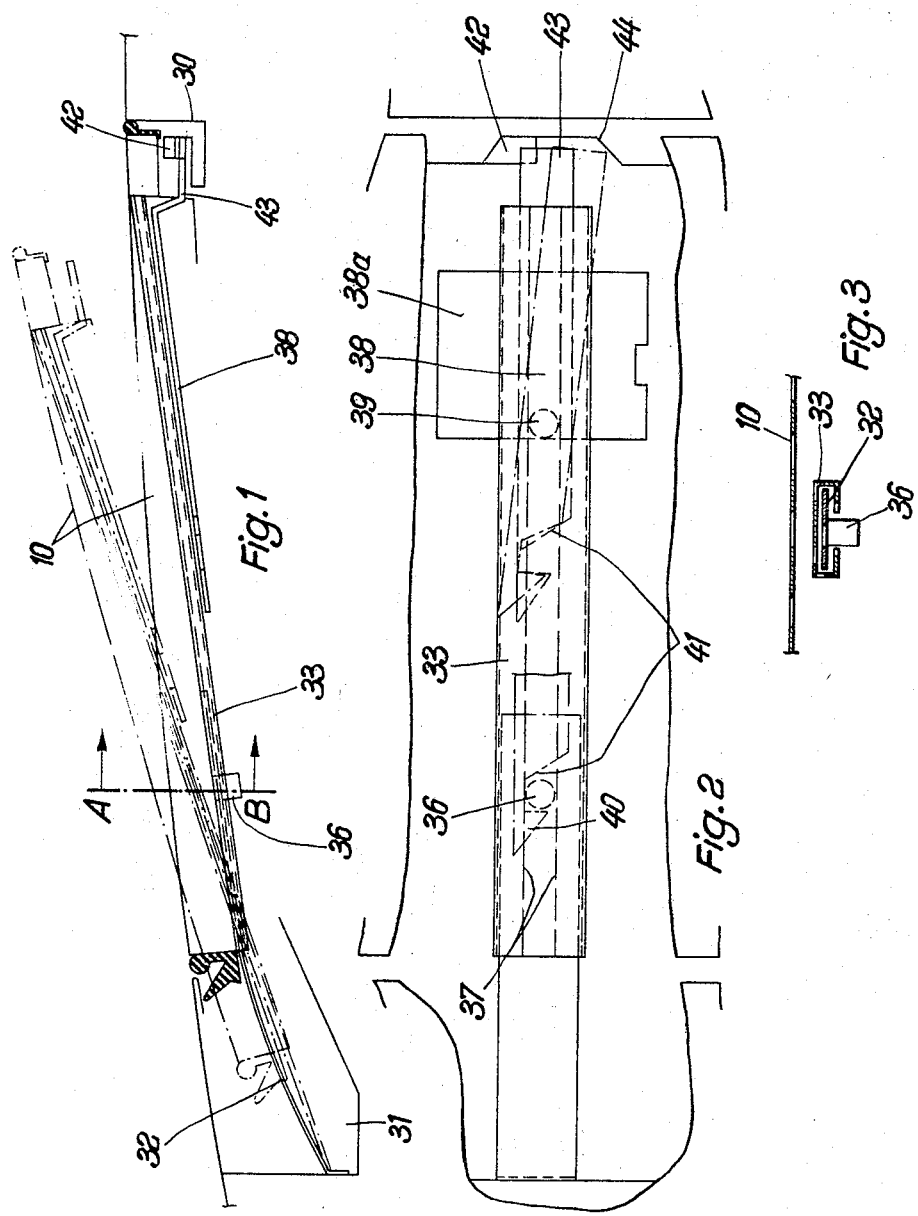

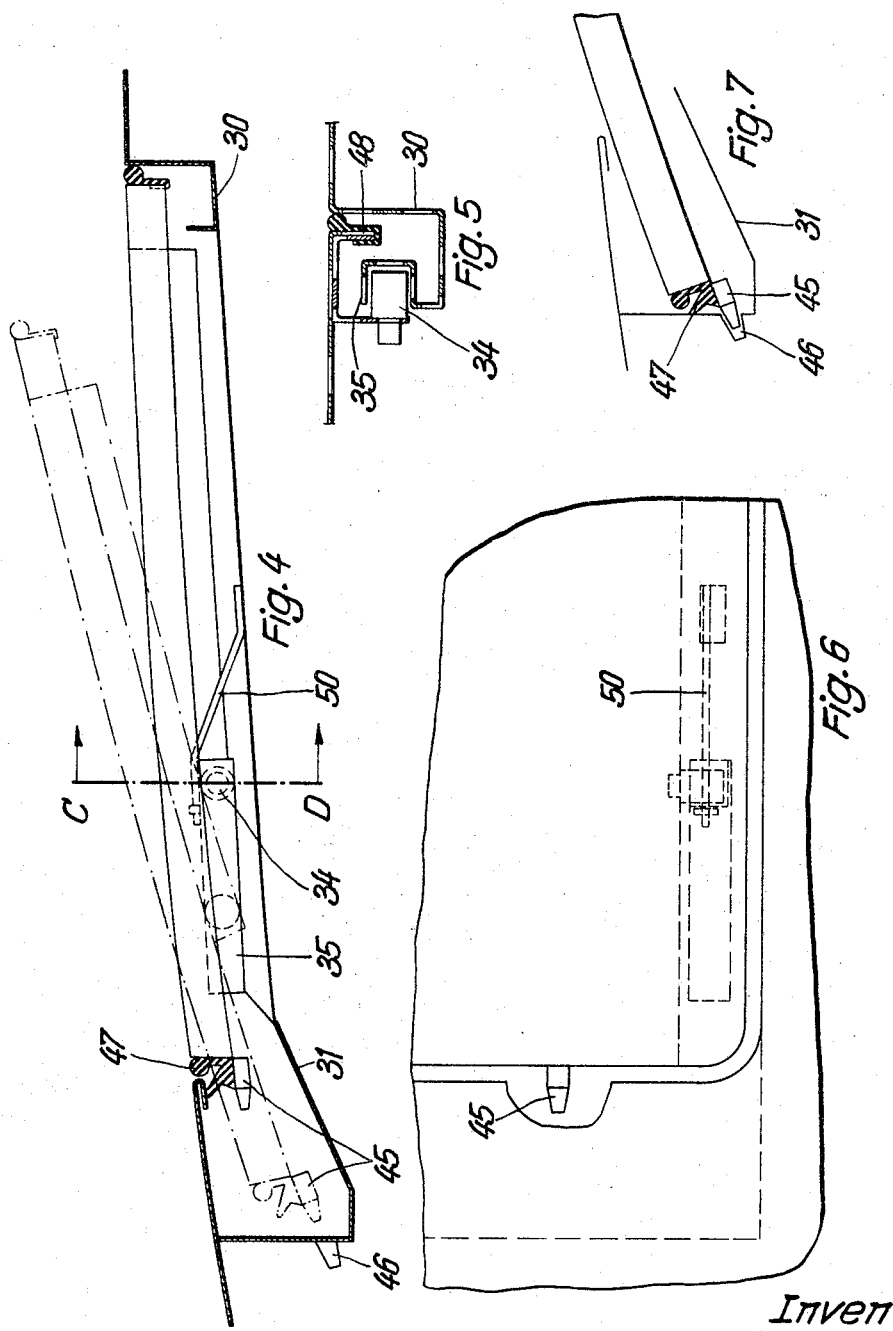

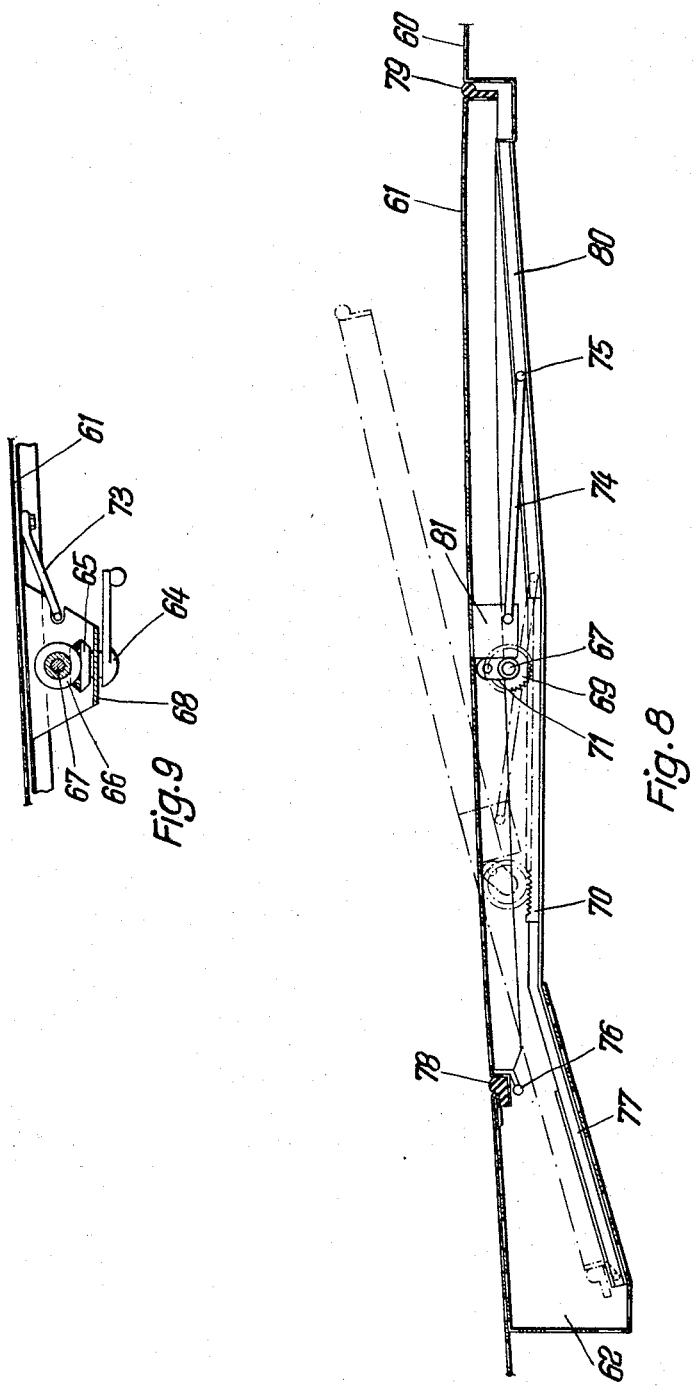

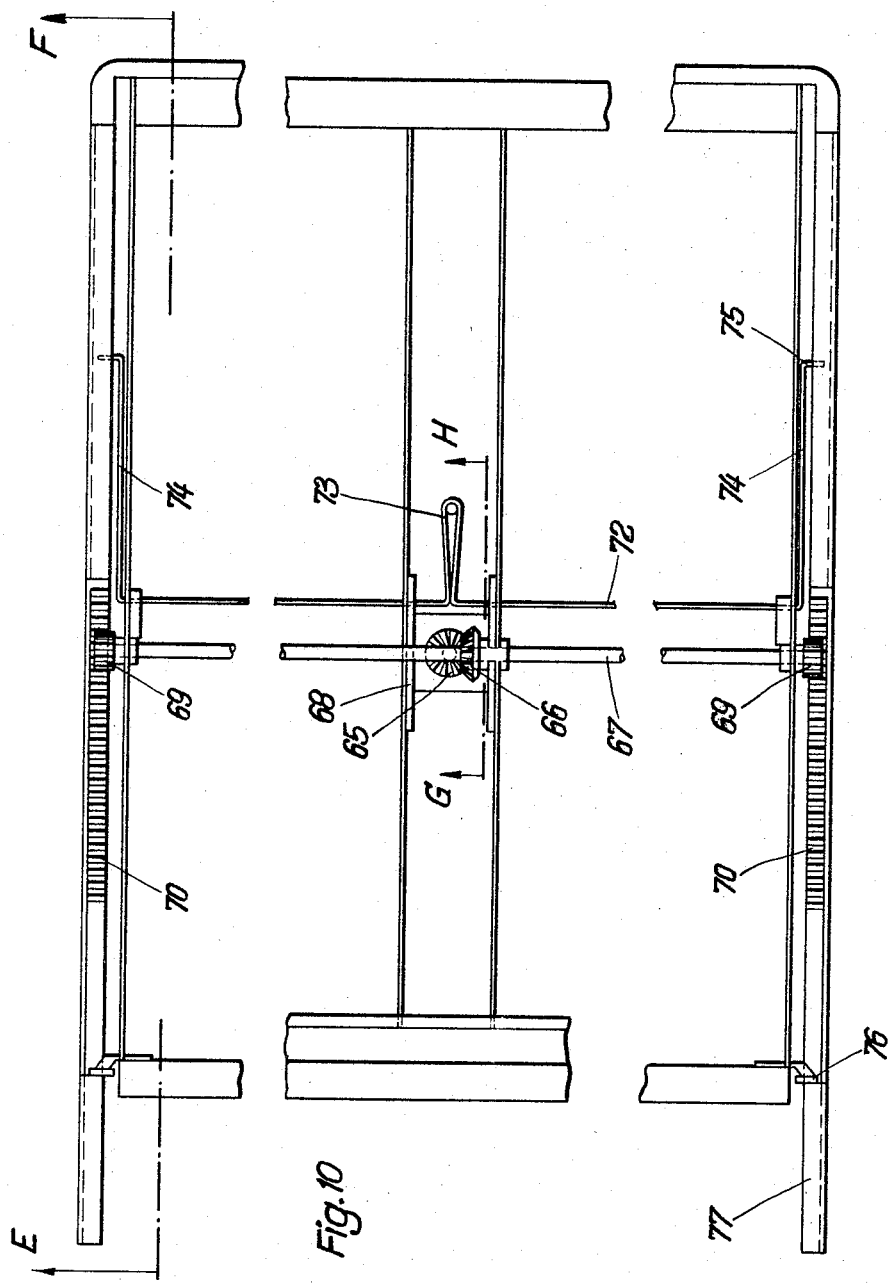

The invention relates to a means for providing draft-free ventilation of vehicles and concerns more particularly a sliding closure, preferably for subsequent installation in the roof of a vehicle, in which it is sealed in the closed postion by means of a locking device against circumferential gaskets in the roof opening.

Rigid sliding roofs are known which usually open a relatively large roof opening by pushing the sliding roof back under the outer skin of the roof. It was found that sliding roofs are often opened during the ride to leave only a gap, in order to avoid excessive draft inside the car, therefore, the relatively large roof opening is not utilized. At higher speed, even a small opening gap causes an annoying draft inside the car, which can only be prevented by installing an additional wind deflector.

Another disadvantage of the known steel sliding roofs is the height required for the installation, which considerably reduces the sitting height in the interior. In modern cars of low construction, this factor is particularly important. The invention is based on the problem of providing a draft-free, simple and inexpensive, as well as space-saving ventilation which is also suitable for subsequent installation.

The subject of the invention is a sliding closure, preferably for subsequent installation in the roof of a car which is sealed in the closed position by means of a locking device against circumferential gaskets, on both sides of which are secured one or more projections. It is guided in guideways or slots arranged in side walls of a pocket-shaped reinforcing frame so that the valve, when advanced into the open position, exposes a part of the roof opening and forms an angle with the roof plane in the manner of a wind deflector.

In another embodiment of the sliding closure, one or several elastic, flat side bars are secured on the inner wall of the front side of the pocket-shaped frame extending in the direction of movement of the closure, and mounted for displacement at least in the range of their free end in the guide channel. These control, together with guide rollers arranged at both sides of the closure and sliding in slots extending preferably parallel to the roof plane, the course of the opening movement as well as the angle of the closure with the roof plane in the open position.

Though these embodiments are inexpensive to manufacture, simple to operate, and do their job, there is frequently a need, particularly in passenger cars, for a mechanized, more comfortable operating device. This is achieved according to the invention in that a hand crank is secured on the underside of the closure, the shaft of which carries a bevel gear which meshes with another bevel gear arranged on a shaft extending across the width of the closure. Pinions are provided at the ends of the shaft which run in racks arranged at the edge of the roof opening and which effect the displacement of the closure, which is guided at least in its front section.

On the underside of the closure, preferably in its rear section, is arranged a torsion bending spring whose center section is secured on the closure in the form of a loop, while the adjoining sections at both sides extend transverse to the closure up to its sides. The end sections are bent at a right angle thereto approximately in the roof plane in such a way that the closure is prestressed into the roof plane because the ends are guided laterally in the roof opening.

Preferably the ends of the shaft are each supported in a lever which is secured on the closure for rotation in a plane perpendicular thereto so that it serves as a lever arm when the shaft bears on a rear stop on the closure, about which the closure is turned into the roof opening bearing tightly on it.

The invention will now be described on the basis of the embodiments represented in the attached drawings.

FIGURE 1 shows a schematic longitudinal section through the center of the closure.

FIGURE 2 is a schematic top view of the guide and locking mechanism of the closure.

FIGURE 3 is a section along the line A—B in FIGURE 1.

FIGURE 4 is a schematic side view of the closure.

FIGURE 5 is a section along the line C—D in FIGURE 4.

FIGURE 6 is a top view of a front portion of the flap.

FIGURE 7 shows schematically the front lock for the open closure.

FIGURE 8 is a longitudinal section through the car roof with a sliding closure according to the invention in a section along the line E—F in FIGURE 10.

FIGURE 9 is a longitudinal section along the line G—H in FIGURE 10.

FIGURE 10 is a schematic top view of the actuating mechanism for closure, the sliding member itself being indicated only in outlines.

In the schematic longitudinal section through a car roof, represented in FIGURE 1, the partly open sliding closure 10 is indicated by broken lines. On the rear side of the roof opening at 30 is a multiple-bent frame profile which forms a trough extending around the rear wall and the side walls, as also indicated in FIGURES 4 and 5. On the front side of the roof opening is provided a pocket-shaped reinforcing frame 31 (as best seen in FIGURE 4) which receives the closure in the open position.

On the front wall of the pocket 31 is secured a side bar 32 of elastic material, the free end thereof being received in a guide channel 33 of the closure 10. The side bar 32 has the function of ensuring a simpler and safe guidance during the opening and closing of the closure 10 and may extend ⅓ of the length of the roof opening. The width of the side bar may be 2 inches for example, and if necessary several side bars 32, symmetrically arranged over the width of the closure, may be used instead of a single side bar in the center of the closure. The side bar is manufactured preferably of flexible steel plate, but plastic can also be used.

In addition, the sliding closure 10 is also guided by lateral projections 34, which may have the form of rollers, slide rings, etc., and which slide in corresponding tracks 35 in the front section of the lateral frame profile in the roof opening (see FIGURE 4). The tracks 35 extend substantially parallel to the roof plane. At both sides of the closure 10 is arranged a projection 34, so that the course of the opening movement of the closure and its angle to the roof plane results from the direction of the side bar 32 and the guidance of the projections 34 in the tracks 35. Also, the position of the projections 34 is determinant, and these are preferably arranged in the front third of the closure length.

The guide channel 33 conforms with the cross-section of the side bar 32 and extends preferably from the bottom front edge of the closure 10 to the rear upper edge and terminates somewhat before. Next to the free end of the side bar 32 is secured a cross pin 36, which slides in a slot 37 of the guide channel 33 when the closure is displaced, and which protrudes from this slot. In the area of the rear end of the closure 10 is arranged at 39 a swivel bolt 38 whose pivotal plane is perpendicular to the axis of the cross pin 36, cutting its section protruding from the guide channel 33. The swivel bolt 38 can be connected to a handle which is arranged above the cover of the underside of the closure and which is actuated from the driver's seat. At its front end, the swivel bolt 38 is provided with an abutting surface 40 (FIGURE 2) and with an adjoining cutout 41, which serves to receive the cross pin 36 when the closure is in its wide open position, as it is represented in FIGURE 2 in dot-dashed lines. Additional cross pins, similar to the cross pin 36, can be provided on the side bar to retain the closure in partly open positions.

The swivel bolt 38 has still another function, namely to lock the closure 10 in the closed position. On the rear wall of the roof opening is arranged at 42 a coupling or counter-bolt part, under which or in whose slot extends the rear side 43 of the swivel bolt 38. If the guide channel 33 extends substantially diagonally through the closure 10, as shown in FIGURE 1, the swivel lever 38, arranged in the same direction, is offset at its end, so that the end is substantially parallel to the roof plane. The circumferential frame trough 30 is recessed in the pivotal area of the bolt 38 at 44. It is advisable to prestress the swivel bolt in its direction of rotation, in which it engages both the cross pin 36 and the counter-bolt part 42. In order to prevent the bolt from turning in the free position farther than is necessary or admissible, a stop can be provided (not represented), which is arranged, like the prestressing spring, under the latch plate 38a (FIGURE 2).

With a greater elasticity of the side bar 32 it is possible that the open closure begins to sway under its own weight when the car undergoes vibrations, namely in the axis of rotation determined by the projections 34. In order to prevent this, two bolts 45 are preferably provided on the bottom front edge of the closure 10 (see FIGURES 4, 6, 7). These bolts 45 are received in corresponding guides 46 in the front wall of the frame pocket 31 when the closure is in open position, and thus hold the closure 10 to prevent swivel movements. In order to obtain a soft noiseless contact of the closure with the front wall of the frame pocket 31, a rubber gasket 47, which bears on the front side of the roof opening in the closed position of the closure, is correspondingly selected and dimensioned.

FIGURE 5 shows a section through the lateral guide of the closure 10 in the frame trough 30 extending behind and laterally of the roof opening. In the guiding area for the projections 34, designed for example, as plastic sliding rollers, the frame trough 30 passes over into a guideway 35 which is closed at the top and open toward the roof opening. The closure 10 covers this guideway and also partly covers the trough 30 with a bent fold 48 and a rubber gasket 49.

If it is desired to remove the closure completely from the roof, it is pushed forward, making the guideway 35 accessible, and a section which is open at the top, but normally closed by a spring clip 50 is exposed by releasing this spring clip.

This clip 50 then bears on the wall of the trough 30 in the direction of the roof. The projections 34 can thus be pulled out at the top from the guideways, so that the closure is disengaged from the side bar 32, after the guide channel 33 has been removed. The section which is at the top and the spring clip 50 closing it can be considered as superfluous if the projections 34 are simply pulled out at the rear from the guideways, with the closure pushed up. It is advisable, however, to close the guideways at the rear in order to prevent the closure from moving accidentally during the closing out of the guide 33 and the guideways 35.

In the embodiment according to FIGURE 8 a sliding closure is arranged in the cut out of a car roof 60 and sealed from all sides. In the actuated position, indicated by dot-dashed lines, the closure 61 is pushed forward into a pocket 62 and forms a wind deflector at an angle with the roof 60, the size of the exposed opening depending on the receiving depth of the pocket 62.

According to FIGURES 9 and 10, a crank 64 is arranged in the center of the closure 61, on whose vertical shaft is arranged a bevel gear 65 which meshes with another bevel gear 66. The bevel gear 66 is secured on a shaft 67 extending across the width of the closure, which is supported, like the crank shaft, in a bracket 68 on its underside. The ends of the shaft carry pinions 69 which run in racks 70 arranged at the side of the roof opening and pointing preferably upward. The shaft 67 is supported in the area of its ends in a lever 71 which is secured on the latter for rotation in a plane perpendicularly to the closure 61.

In the rear section of the closure is arranged a torsion bending spring 72 extending parallel to the shaft 67, which is secured by means of a central loop 73 on the closure. At both sides of the closure 61, the spring 72 is bent at a right angle to the rear (according to the top view in FIGURE 10), these end sections 74 being again bent to the outside at their ends 75, so that they can serve directly as rear guide elements of the closure or be provided with rollers, slide rings etc. The spring 72 has the function of prestressing the closure into the roof opening, and at the same time locking it in the open position in the guides, due to the initial stress.

In the front section of the closure are provided lateral front guide-elements 76 (FIGURE 8). They engage front guide rails 77 inside the pocket 62 as soon as the hand crank is turned. The closure has been unlocked over the levers 71, and the gaskets 78, 79 have brought the closure due to their elasticity, into a slightly inclined position against the action of the spring 72. The inclination of the closure 61 in its open position is thus determined by the course of the front guide rails 77 and the rear guide rails 80, in which slide the ends of the spring 72.

During the closing (as well as during the opening) of the closure, the pinions 69 are always pressed against the racks 70 by the force of the spring 72; the closure moves then to the rear until it hits the end of the roof opening. At this moment, the front guide rails 76 leave the guides 77. If the pinions 69 are moved further by the crank 64, they will perform a swivel movement (with the shaft) about the fulcrum of the levers 71 until the shaft 67 bears on a stop 81 secured on the closure 61. If the pinions are turned further, the entire closure will turn about the shaft 67, so that it can be pressed completely tight and locked in the roof opening. The closure can be completely removed from the opening in the roof when the rear guide elements 75 are pulled out of the rails 80.

The above described measures for moving, guiding and pressing the closure from the top against its gasket and for locking it are not limited to forward-moving sliding roofs. In backward-moving sliding roofs it is only necessary to reverse the total arrangement. To this end the guides have preferably a flatter inclination, in which case the simultaneous function as a wind deflector is unnecessary. If the springs 72, 74 should no longer be adequate to hold the closure in intermediate positions, additional locking means can be provided which, acting in the manner of brakes, move from the closure to the side walls of the roof opening and which are actuated over a locking handle. The locking in intermediate positions could also be effected by moving the fulcrums of the lever 71 over a handle and a rope or bar mechanism in such a way that the levers are perpendicular to the valve in the desired opening position. Instead of this solution, the stops 81 on both sides could be made movable, but would naturally have to be separated in this case from the bearing of the springs 72, 74.

While the invention has been described, it will be understood that it is capable of further modifications and this application is intended to cover any variations, uses or adaptations of the invention following in general, the principles of the invention and including such departures from the present disclosure as come within known or customary practice in the art to which the invention pertains, and as may be applied to the essential features hereinbefore set forth and as fall within the copies of the invention or the limits of the appended claims.

Having thus described my invention, what I claim is:

1. A vehicle sliding roof closure comprising:
   (a) a support mounted in an opening in the roof of a vehicle having a front end and a rear end,
   (b) a slidable closure member positioned in said support and being movable toward the rear of the vehicle in a closed position and toward the front of the vehicle in an open position,
   (c) means for positioning said slidable closure member at an angle with the roof of the vehicle in the open position, said angle formed by said closure member and the roof having its juncture toward the front of the vehicle and said slidable closure member extending above the roof of the vehicle in the open position to form a wind deflector.

2. A vehicle sliding roof closure as defined in claim 1 wherein said support includes support slots along its side walls and said closure member includes projections slidable in said support slots.

3. A vehicle sliding roof closure as defined in claim 2 wherein said support slots are in the form of tracks and are located on opposite sides of said support and said projections are in the form of rollers mounted in said tracks.

4. A vehicle sliding roof closure as defined in claim 1 wherein said support includes a pocket mounted at the end closest the front of the vehicle for receiving said closure member.

5. A vehicle sliding roof closure as defined in claim 4 wherein said closure member has at least one forwardly projecting bolt which will cooperate with a complementary recess in said pocket to lock said closure member on its most forward position.

6. A vehicle sliding roof closure as defined in claim 4 wherein said closure member includes a guide channel, an elastic side bar is secured in said pocket, said side bar being guided in said channel.

7. A vehicle sliding roof closure as defined in claim 1, and wherein said support includes a pair of slots and said closure member includes cooperating projections slidable in said slots, said support further including a pocket and at least one elastic bar mounted in said pocket and a channel located in said valve member, said bar being guided in said channel, said slots and projections and said bar and channel controlling the movement of said closure member and the angle of said closure member to the roof of the vehicle.

8. A vehicle sliding roof closure as defined in claim 6 wherein said elastic side bar extends into said roof opening, said bar carrying near the end extending into the opening a cross pin, a slot in said channel, and said cross pin sliding in said channel slot.

9. A vehicle sliding roof closure as defined in claim 8 further including a swivel bolt articulated adjacent the rear end of said closure member coupling said swivel bolt to said cross pin.

10. A vehicle sliding roof closure as in claim 9 wherein said swivel bolt rotates in a plane perpendicular to the axis of said cross pin in the area of the end that protrudes from said channel slot.

11. A vehicle sliding roof closure as defined in claim 9 wherein said swivel bolt is provided at its front end with a contact surface and a cut-out recess for receiving said cross pin in the forward open position of the closure member.

12. A vehicle sliding roof closure as defined in claim 9 wherein said swivel bolt has a rear end which cooperates with a coupling means mounted on said support to lock said closure member in its rearward closed position.

13. A vehicle sliding roof closure as defined in claim 10 wherein said swivel bolt is prestressed to insure locking in its forward open position.

14. A vehicle sliding roof closure as defined in claim 12 wherein said swivel bolt is prestressed to insure locking in its rearward, closed position.

15. A vehicle sliding roof closure as defined in claim 1 including a hand-operated means provided on the under side of said closure member, said hand-operated means connected to means to actuate said closure member to its forward, open position.

16. A vehicle sliding roof closure as defined in claim 15 wherein said hand-operated means is a crank.

17. A vehicle sliding roof closure as defined in claim 16 wherein said crank is provided with a crank shaft, first and second bevel gears, said crank shaft carrying said first bevel gear, said first bevel gear meshing with said second bevel mounted on a second shaft mounted on said closure member transverse to said crank shaft, said second shaft being connected to reciprocating means on said support.

18. A vehicle sliding roof closure as defined in claim 17 wherein said reciprocating means consists of at least one pinion gear on said second shaft cooperating with at least one rack on said support.

19. A vehicle sliding roof closure as defined in claim 15 wherein a torsion bending spring is provided between said closure member and said support.

20. A vehicle sliding roof closure as defined in claim 19 wherein said second shaft is supported in a pair of levers pivotally mounted on said closure member whereby said levers act as a lever arm when said second shaft bears on a rear stop on said closure member about which said closure member turns into the roof opening with the initial stress of said spring, thus forming a locking position.

21. A vehicle sliding roof closure as defined in claim 19 wherein said torsion bending spring is provided with outwardly bent ends adapted to engage rear guide rails on said support.

22. A vehicle sliding roof closure as defined in claim 21 wherein said bent ends may be removed from engagement with said rear guide rails to remove said closure member from said support.

23. A vehicle sliding roof closure as defined in claim 15 wherein projections are provided on opposite sides of said closure member at the forward end thereof, a pocket in the forward end of said support, obliquely inclined forward guides in said pocket, said projections movable in said forward guides when said closure member moves toward its forward, open position, said forward guides determining the angle said closure member forms with the roof.

References Cited

UNITED STATES PATENTS

| | | | |
|---|---|---|---|
| 1,715,940 | 6/1929 | Mobbs | 296—137 |
| 2,853,340 | 9/1958 | Hershberger | 296—100 X |
| 2,973,991 | 3/1961 | Werner | 296—137 |
| 3,033,608 | 7/1962 | Golde | 296—137 |
| 3,044,825 | 7/1962 | Golde | 296—137 |

FOREIGN PATENTS

| | | |
|---|---|---|
| 504,745 | 5/1939 | Great Britain. |
| 727,167 | 3/1955 | Great Britain. |
| 18,301 | 10/1913 | France. |
| 1,066,943 | 6/1954 | France. |

BENJAMIN HERSH, *Primary Examiner.*

C. C. PARSONS, *Assistant Examiner.*